Sept. 19, 1967  R. D. CRIBBS  3,343,066

VOLTAGE AND CURRENT CONTROLLED RECTIFIER

Filed Oct. 23, 1964

INVENTOR.
ROBERT D. CRIBBS

BY

*Marvin Moody*

ATTORNEY

United States Patent Office 3,343,066
Patented Sept. 19, 1967

3,343,066
VOLTAGE AND CURRENT CONTROLLED RECTIFIER
Robert D. Cribbs, Cedar Rapids, Iowa, assignor to Collins Radio Company, Cedar Rapids, Iowa, a corporation of Iowa
Filed Oct. 23, 1964, Ser. No. 405,924
4 Claims. (Cl. 321—18)

This invention relates in general to a charging device and in particular to an automatic charging circuit which prevents over-charging of a battery.

Ofttimes it is desirable to charge a battery at a rate not to exceed a particular current so as to prevent the battery from being over-charged.

It is the object of the present invention to provide a charging circuit which is automatically controlled so as to eliminate excessively high currents into the device being charged.

Another aspect of the invention is to provide a charging circuit which automatically shuts off the charging current when a device is completely charged.

A feature of this invention is found in the provision for a charging circuit with a realy in the charging path which controls the output of the charging circuit so as to eliminate over-loading of the circuit.

Further features, objects and advantages of the invention will become apparent from the following description and claims when read in view of the drawings in which;

Figure 1:
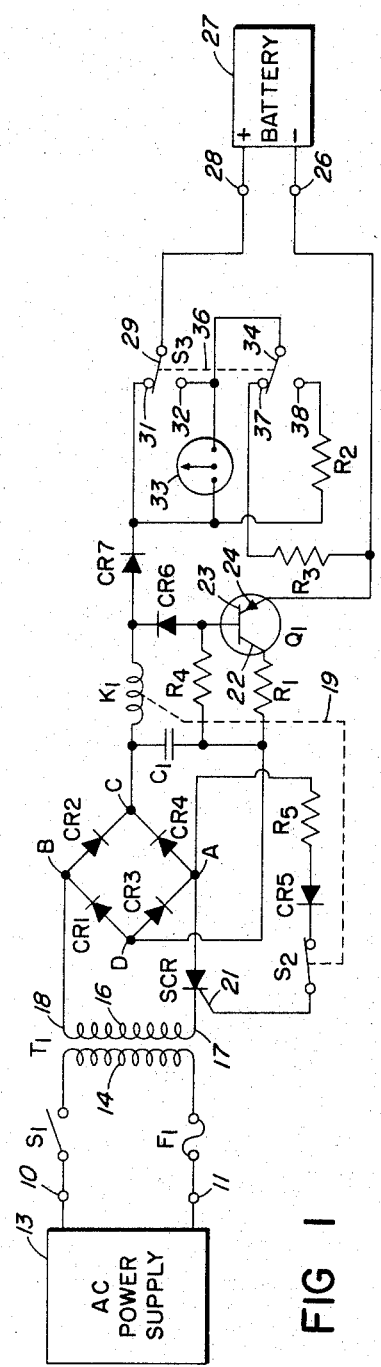
FIGURE 1 is a battery charging circuit in accordance with this invention.
Figure 2:
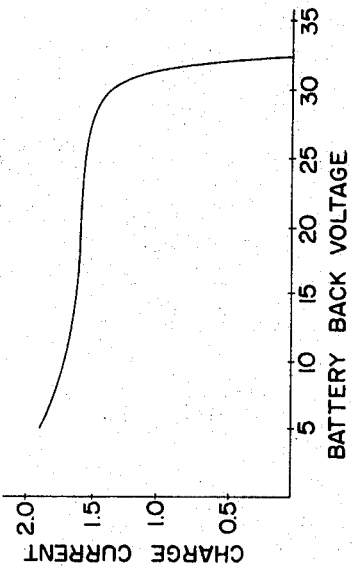
FIGURE 2 is a typical charging circuit characteristic with charge current plotted against the back voltage of the battery being charged by the circuit.

FIGURE 1 illustrates a pair of input terminals 10 and 11 to which a suitable A.C. power supply 13 is connected. A fuse $F_1$ is connected to input terminal 11 and a switch $S_1$ is connected to input terminal 10. A primary 14 of transformer $T_1$ is connected between the fuse $F_1$ and the switch $S_1$. The secondary 16 of the transformer $T_1$ is connected to a bridge rectifier comprising diode rectifiers $CR_1$, $CR_2$, $CR_3$, and $CR_4$. A silicon controlled rectifier SCR is connected in series between the end 17 of secondary 16 and point A of the diode rectifier. The other end 18 of the secondary 16 is connected to point B of the diode rectifier and the output of the bridge rectifier is removed from points C and D of the bridge rectifier.

A condenser $C_1$ is connected cross points C and D. An energizing coil $K_1$ of a relay is connected in series between point C and a diode $CR_7$. The armature of energizing coil $K_1$ is coupled by mechanical linkage 19 to a switch $S_2$.

Switch $S_2$ has one side connected to the control electrode 21 of the silicon controlled rectifier and a diode $CR_5$. $CR_5$ is connected to a resistor $R_5$ which has its opposite side connected to point A of the rectifier.

Point D is connected to the collector 22 of transistor $Q_1$ through resistor $R_1$. A resistor $R_4$ is connected from point D to the base 23 of transistor $Q_1$. A diode $CR_6$ is connected from base 23 to the junction between diode $CR_7$ and relay coil $K_1$.

The emitter 24 is connected to the negative output terminal 26 to which a battery 27, to be charged, may be connected.

The positive output terminal 28 is also connected to battery 27 and to the movable contact 29 of a switch $S_3$. Contact 29 can move between fixed contacts 31 and 32.

Contact 31 is connected to diode $CR_7$ and contact 32 is connected to a meter 33. The other side of meter 33 is connected to contact 31. A second movable contact 34 forms a part of switch $S_3$ and is mechanically linked to contact 29 by linkage 36. Switch 34 moves between fixed contacts 37 and 38.

Contact 37 is connected to terminal 26 through dropping resistor $R_3$. Contact 38 is connected to contact 31 through the meter shunting resistor $R_2$.

In a particular charger constructed, the components had the following values:

| | |
|---|---|
| Power Supply 13 | 115 volts, 400 cycles per second. |
| $CR_1$, $CR_2$, $CR_3$, $CR_4$, $CR_7$ | Type 1N1342A. |
| $CR_5$ | Type 1N457. |
| $CR_6$ | Type 1N2990B. |
| SCR | Type 2N1601. |
| Transformer $T_1$ | 115 to 36 volts. |
| $R_1$ | 2.5 ohms. |
| $R_2$ | 0.03 ohms. |
| $R_3$ | 21,000 ohms. |
| $R_4$ | 180 ohms. |
| $R_5$ | 47 ohms. |
| $C_1$ | 800 mfd. |
| Battery voltage | 0–32.5 volts. |

In operation the SCR is turned "on" as long as the switch $S_2$ in its control circuit is closed. This switch is controlled by relay $K_1$. The rectified output from the bridge circuit is filtered by $C_1$ and current passes through current sensing relay $K_1$. Switch $S_1$ remains closed until the current through $K_1$ reaches 2.0 amps. At this time the relay is energized and the switch $S_2$ is opened. SCR stops conducting when this happens on the next half cycle and remains in this state until $C_1$ discharges and the current through $K_1$ falls to 1.5 amps. At this time the relay de-energizes, closing switch $S_2$, which turns SCR back on. The rate that $K_1$ goes between the energized and deenergized states depends upon the battery back voltage and the input power voltage. Life of a relay of this type is in excess of one hundred million operations.

After the current regulator, the charge current passes through a voltage regulator consisting of transistor $Q_1$, $R_1$, $R_4$ and $CR_6$. Transistor $Q_1$ is normally conducting and is a low impedance to the charging current. When the battery voltage gets close to its maximum allowable voltage of 32.5 volts, $CR_6$ conducts and biases transistor $Q_1$ to cut-off, thereby reducing the charge current to zero.

$CR_7$ prevents current flow in the wrong direction and would keep the battery from discharging through the charger circuitry if the charger were turned off but not disconnected from the battery.

Components switch $S_3$, $R_3$, $R_2$ and the meter 33 comprise a circuit that allows the monitoring of charging current in the A position of switch $S_3$ and of the battery voltage in the V position.

This circuit features constant current output as (a) the battery back voltage increases from near zero to that of fully charged and (b) as the power input voltage is varied over a wide range. The control circuitry does not use heavy, expensive magnetic amplifiers as do most constant current chargers, but instead uses a silicon controlled rectifier and a glass reed relay which makes a light, simple, and inexpensive current regulator. The table below shows how constant the charge current is as the battery voltage is varied between 5 and 30 volts and the line voltage is varied from 105 to 135 volts. The current drop off in the 30–32 volt region is due to the voltage regulator which is designed to prevent the battery from exceeding 32.5 volts. Figure shows a typical charge current curve as the battery back voltage is varied from 5 to 33 volts.

BATTERY CHARGER OPERATION

| Battery Back Voltage | Charge Current, Amps | | | |
|---|---|---|---|---|
| | 105 v. Power Input | 115 v. Power Input | 125 v. Power Input | 135 v. Power Input |
| 5 | 1.7 | 1.8 | 2.0 | 2.0 |
| 10 | 1.6 | 1.7 | 1.7 | 1.7 |
| 15 | 1.5 | 1.5 | 1.6 | 1.6 |
| 20 | 1.5 | 1.5 | 1.4 | 1.5 |
| 25 | 1.5 | 1.6 | 1.5 | 1.4 |
| 30 | 0.9 | 1.4 | 1.5 | 1.4 |
| 31 | 0.7 | 1.2 | 1.4 | 1.5 |
| 32 | 0.2 | 0.5 | 0.6 | 0.6 |
| 33 | 0 | 0 | 0 | 0 |

It is seen that this invention provides an automatic battery charging circuit. Although this invention has been described with respect to a particular embodiment thereof, it is not to be so limited as changes and modifications may be made therein which are within the spirit and scope of the invention as defined by the appended claims.

I claim:
1. A charging circuit comprising: a source of alternating current, a rectifier connected to the output of said source, a gate circuit connected between said source and said rectifier to remove said rectifier from said source upon operation of said gate circuit, said gate circuit including a current sensitive relay and an electronic device having a control terminal, the current sensitive element of said relay receiving the output of said rectifier and the switch element of said relay connected to said control terminal so that operation of said current sensitive relay removes said source from said rectifier, a voltage regulation circuit connecting between said rectifier and the output of said charging circuit, said voltage regulation circuit preventing the output voltage of said charging circuit from exceeding a predetermined value.

2. The circuit of claim 1 wherein said voltage regulation circuit is a transistor, the output load of said charging circuit is a D.C. storage element, and said electronic device is a silicon controlled rectifier.

3. The circuit of claim 2 including a polarity sensitive element connected between said rectifier and said storage element to prevent discharge of said storage element into said charging circuit.

4. The circuit of claim 3 wherein said rectifier is a diode bridge and wherein said polarity sensitive element is a diode.

References Cited

UNITED STATES PATENTS

| | | | |
|---|---|---|---|
| 3,239,718 | 3/1966 | Fegley | 317—33 |
| 3,177,402 | 4/1965 | Muchnick et al. | 317—33 |
| 3,085,187 | 4/1963 | Godshalk | 317—33 |
| 3,213,351 | 10/1965 | Walker | 321—18 |
| 3,201,649 | 8/1965 | Ferri | 321—11 |
| 3,132,287 | 5/1964 | Yarbrough | 317—33 |
| 3,129,373 | 4/1964 | Godshalk et al. | 321—18 |
| 3,009,091 | 11/1961 | Hollidy | 322—28 |
| 2,660,702 | 11/1953 | Arvidsson | 321—16 |

JOHN F. COUCH, *Primary Examiner.*

M. WACHTELL, *Assistant Examiner.*